US010823166B2

(12) United States Patent
Breault et al.

(10) Patent No.: US 10,823,166 B2
(45) Date of Patent: Nov. 3, 2020

(54) NEGATING CHECK VALVE

(71) Applicant: Henkel IP & Holding GmbH, Duesseldorf (DE)

(72) Inventors: John P. Breault, New Britain, CT (US); Steven J. Hemsen, Southington, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 316 days.

(21) Appl. No.: 15/819,783

(22) Filed: Nov. 21, 2017

(65) Prior Publication Data

US 2018/0073501 A1 Mar. 15, 2018

Related U.S. Application Data

(63) Continuation of application No. PCT/US2016/033499, filed on May 20, 2016.
(Continued)

(51) Int. Cl.
| F04B 13/00 | (2006.01) |
| F04B 53/06 | (2006.01) |
| F04B 53/10 | (2006.01) |
| F04B 9/125 | (2006.01) |
| F04B 15/02 | (2006.01) |

(Continued)

(52) U.S. Cl.
CPC ............ F04B 53/06 (2013.01); B05B 9/0409 (2013.01); F04B 9/125 (2013.01); F04B 13/00 (2013.01); F04B 15/02 (2013.01); F04B 53/1002 (2013.01); F16K 15/044 (2013.01); F04B 19/22 (2013.01)

(58) Field of Classification Search
CPC ......... F04B 13/00; B29B 7/603; F16K 15/026
USPC ..................................... 137/315.33
See application file for complete search history.

(56) References Cited

U.S. PATENT DOCUMENTS

| 4,466,779 A | 8/1984 | Nixon |
| 5,061,159 A * | 10/1991 | Pryor .................. F04B 53/1002 |
| | | 417/454 |

(Continued)

FOREIGN PATENT DOCUMENTS

| DE | 202011108107 | 2/2013 |
| SU | 303447 | 8/1971 |

(Continued)

OTHER PUBLICATIONS

International Search Report issued in connection with International Patent Application No. PCT/US2016/033499 dated Aug. 25, 2016.

*Primary Examiner* — Patrick Hamo
(74) *Attorney, Agent, or Firm* — Steven C. Bauman (57) ABSTRACT

A positive displacement pump for dispensing fluid includes a fluid body sub-assembly including a fluid body and a negating check valve. The negating check valve includes a negating body defining a dispensing opening. The fluid body and the negating body form a flow path for the fluid. The fluid is dispensed through the dispensing opening. The positive displacement pump is primed by allowing trapped air within the flow path to flow out of the dispensing opening. The negating check valve may be fully or partially attached to the fluid body. The trapped air within the flow path flows out of the dispensing opening when the negating check valve is partially attached to the fluid body.

18 Claims, 11 Drawing Sheets

Related U.S. Application Data (60) Provisional application No. 62/164,920, filed on May 21, 2015.

(51) Int. Cl.
  *B05B 9/04* (2006.01)
  *F16K 15/04* (2006.01)
  *F04B 19/22* (2006.01)

(56) References Cited

U.S. PATENT DOCUMENTS

| | | | | |
|---|---|---|---|---|
| 5,159,872 | A * | 11/1992 | Dettmers | E21D 15/512 137/901 |
| 7,017,605 | B2 * | 3/2006 | Stroud | F16K 31/383 137/490 |
| 7,395,836 | B2 * | 7/2008 | Krebs | F16K 15/044 137/269 |
| 7,624,748 | B2 * | 12/2009 | Krebs | F16K 15/025 137/15.17 |
| 7,681,589 | B2 * | 3/2010 | Schwegman | F16K 15/063 137/15.17 |
| 8,444,398 | B2 * | 5/2013 | Brunet | F04B 47/02 137/15.18 |
| 8,444,401 | B2 | 5/2013 | Prettl | |
| 8,523,541 | B2 * | 9/2013 | Hermann | F04B 1/0452 137/15.19 |
| 9,328,722 | B2 | 5/2016 | Kaibel et al. | |
| 9,458,843 | B2 | 10/2016 | Cardelius et al. | |
| 10,221,838 | B2 | 3/2019 | Wichmann | |
| 2014/0260565 | A1 | 9/2014 | Imamura et al. | |

FOREIGN PATENT DOCUMENTS

| | | |
|---|---|---|
| WO | 2010076243 | 7/2010 |
| WO | 2014016388 | 1/2014 |
| WO | 2014195312 | 12/2014 |

* cited by examiner

NEGATING CHECK VALVE

TECHNICAL FIELD

The present invention relates generally to positive displacement pumps for adhesive dispensing.

BACKGROUND

Traditional positive displacement pumps dispense fluids and/or adhesives by displacing a fixed amount of fluid trapped within a displacement chamber of a positive displacement pump's flow path. Air may become trapped inside the pump's displacement chamber and other parts of the pump's flow path and interfere with the pump's ability to dispense adhesive accurately. One approach to remove trapped air is through bleed holes. However, the bleed holes can get plugged by the adhesive, are messy and provide a low level of confidents that all the trapped air has been removed from the pump's flow path.

SUMMARY

A positive displacement pump for dispensing fluid includes a fluid body sub-assembly including a fluid body and a negating check valve. The negating check valve includes a negating body defining a dispensing opening. The fluid body and the negating body form a flow path for the fluid. The fluid is dispensed through the dispensing opening. The positive displacement pump is primed by allowing trapped air within the flow path to flow out of the dispensing opening.

These and other objects, features and advantages of the present disclosure will become apparent in light of the following description of exemplary embodiments, with reference to the accompanying drawings.

DETAILED DESCRIPTION

Figure 1:
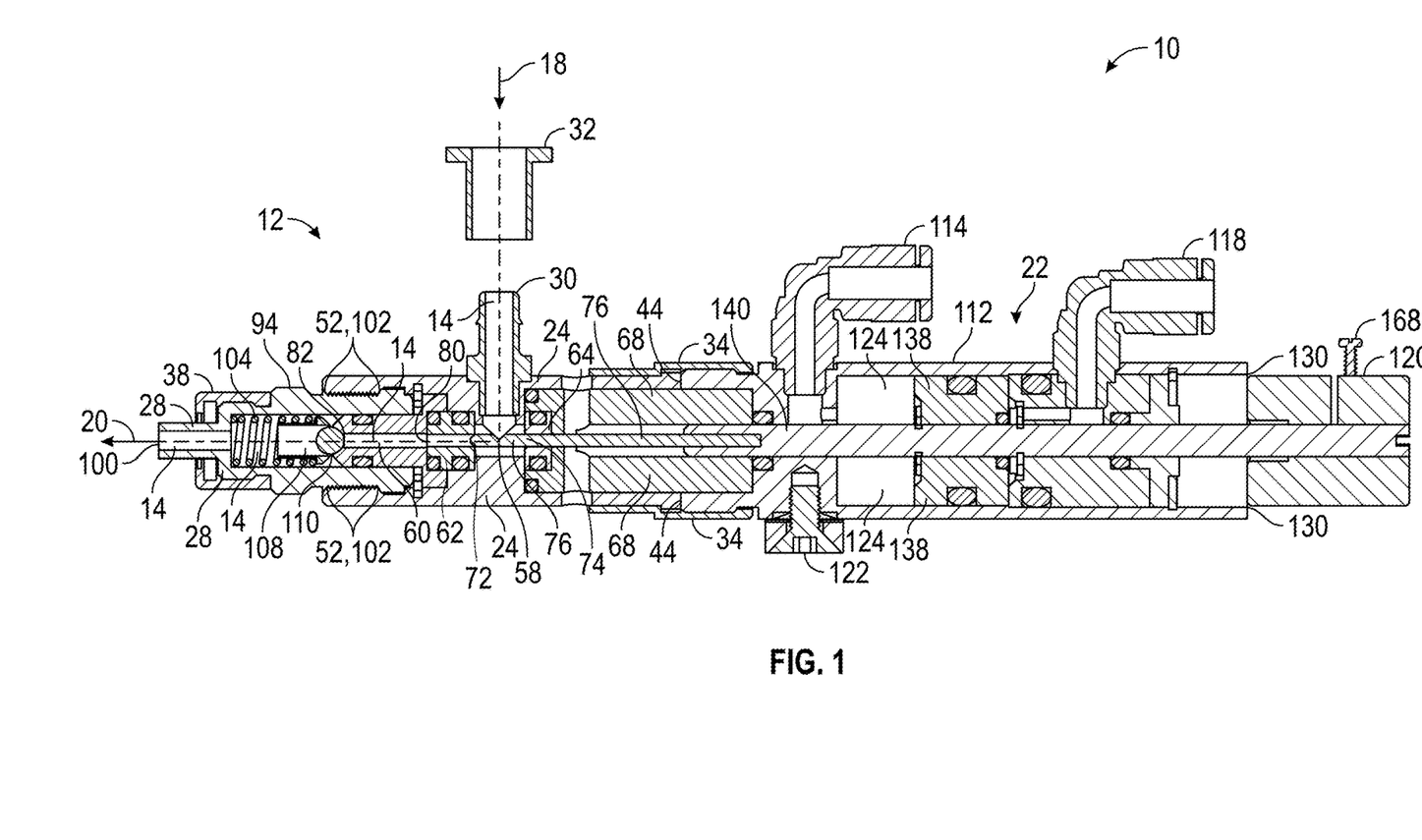
FIG. 1 is a cross-sectional view of a positive displacement pump.
Figure 2:
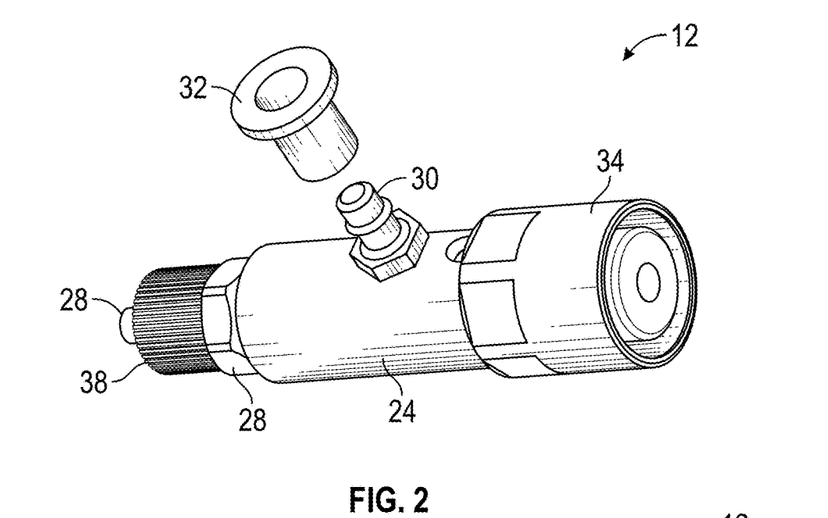
FIG. 2 is a top, right perspective view of a fluid body sub-assembly of the positive displacement pump of FIG. 1.
Figure 3:
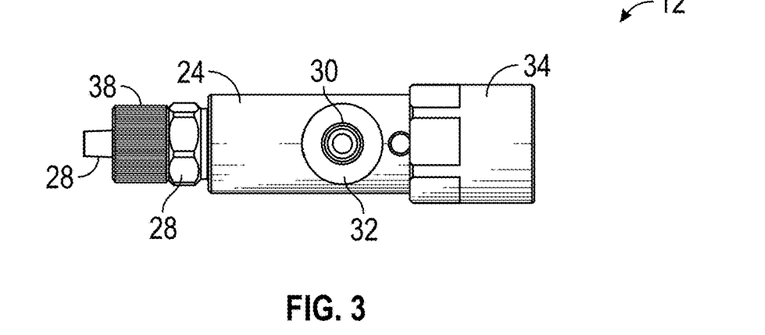
FIG. 3 is a top view of the fluid body sub-assembly of the positive displacement pump of FIG. 1.
Figure 4:
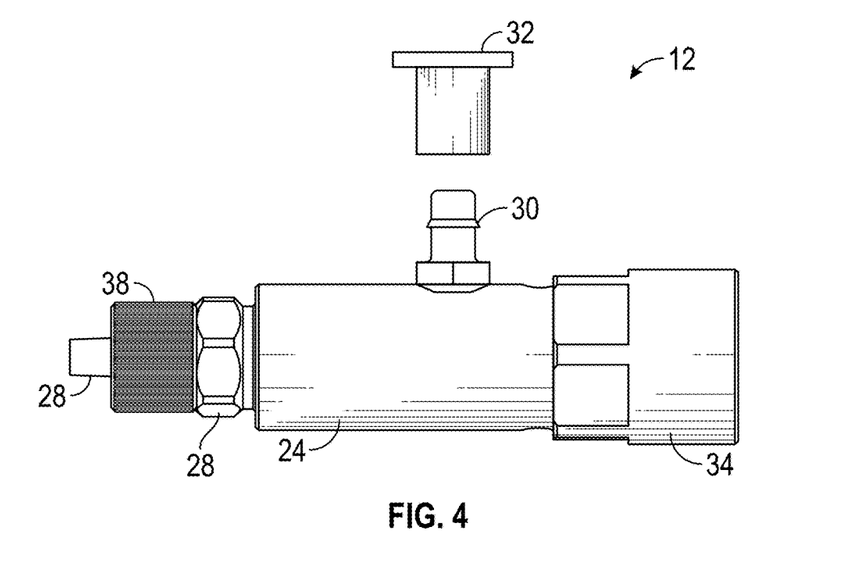
FIG. 4 is a front view of the fluid body sub-assembly of the positive displacement pump of FIG. 1.
Figure 5:
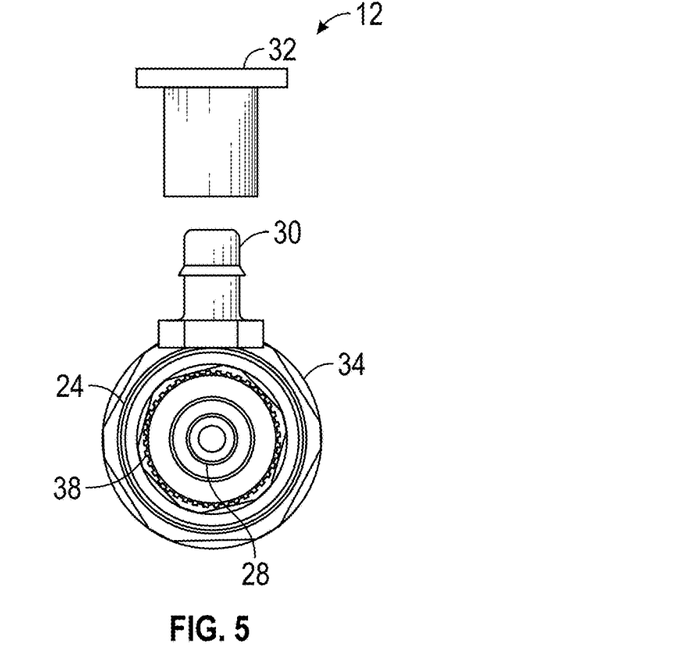
FIG. 5 is a right-hand side view of the fluid body sub-assembly of the positive displacement pump of FIG. 1.
Figure 6:
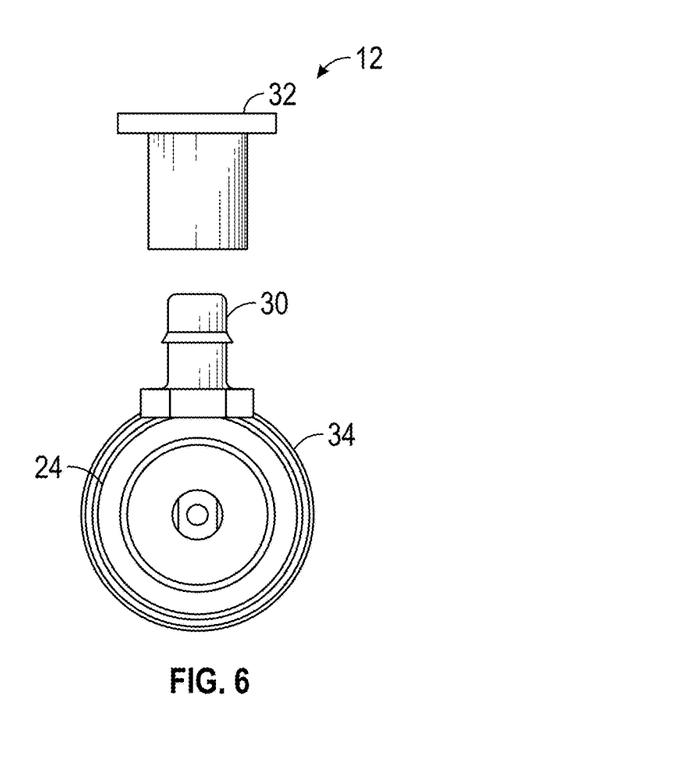
FIG. 6 is a left-hand side view of the fluid body sub-assembly of the positive displacement pump of FIG. 1.

Referring to FIG. 1, a positive displacement pump 10 includes a fluid body sub-assembly 12 that forms a flow path 14 through which pressurized fluid is dispensed in the direction shown by arrows 18 and 20. The positive displacement pump 10 may further include a cylinder sub-assembly 22 connected to the fluid body sub-assembly 12. The cylinder sub-assembly 22 facilitates the dispensing of the pressurized fluid by displacing the pressurized fluid in the flow path 14.

Referring to FIGS. 1-6, the fluid body sub-assembly 12 includes a fluid body 24 that defines the flow path 14 and a negating check valve 28 attached to the fluid body 24 that dispenses the pressurized fluid. The fluid body sub-assembly 12 further includes a barbed fitting hose connector 30 fluidly connected to the fluid body 24. The barbed fitting hose connector 30 penetrates the fluid body 24 and defines the beginning of the flow path 14 through the fluid body sub-assembly 12. A flanged locking sleeve 32 fits over the barbed fitting hose connector 30 and attaches to the fluid body 24. The fluid body sub-assembly 12 further includes a valve coupling 34 that fits over the fluid body 24 and secures the fluid body sub-assembly 12 to the cylinder sub-assembly 22. The fluid body sub-assembly 12 further includes a tip retainer nut 38. The barbed fitting hose connector 30, the fluid body 24 and the negating check valve 28 form the flow path 14.

Figure 7:
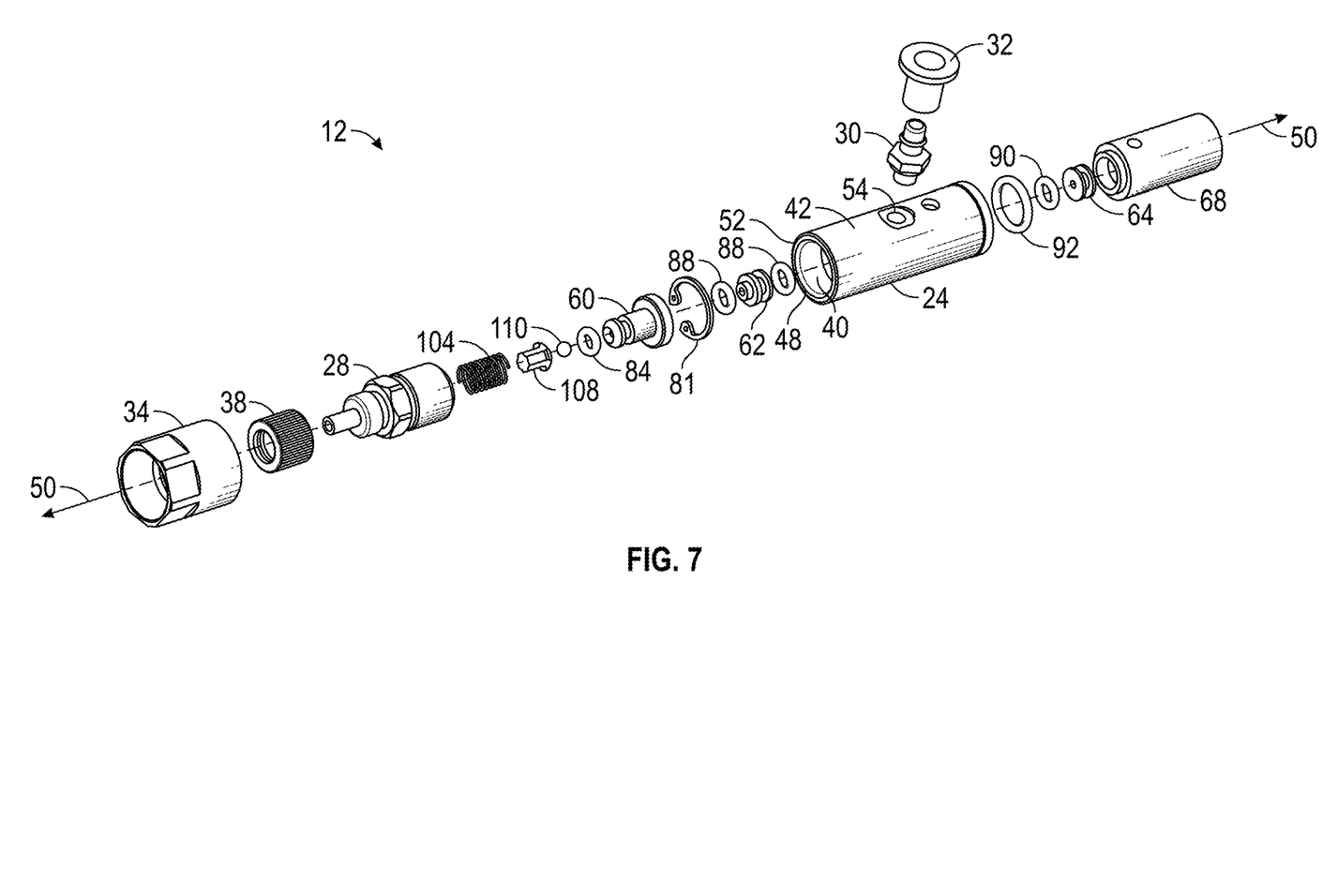
FIG. 7 is an exploded view of the fluid body sub-assembly of the positive displacement pump of FIG. 1.
Figure 8:
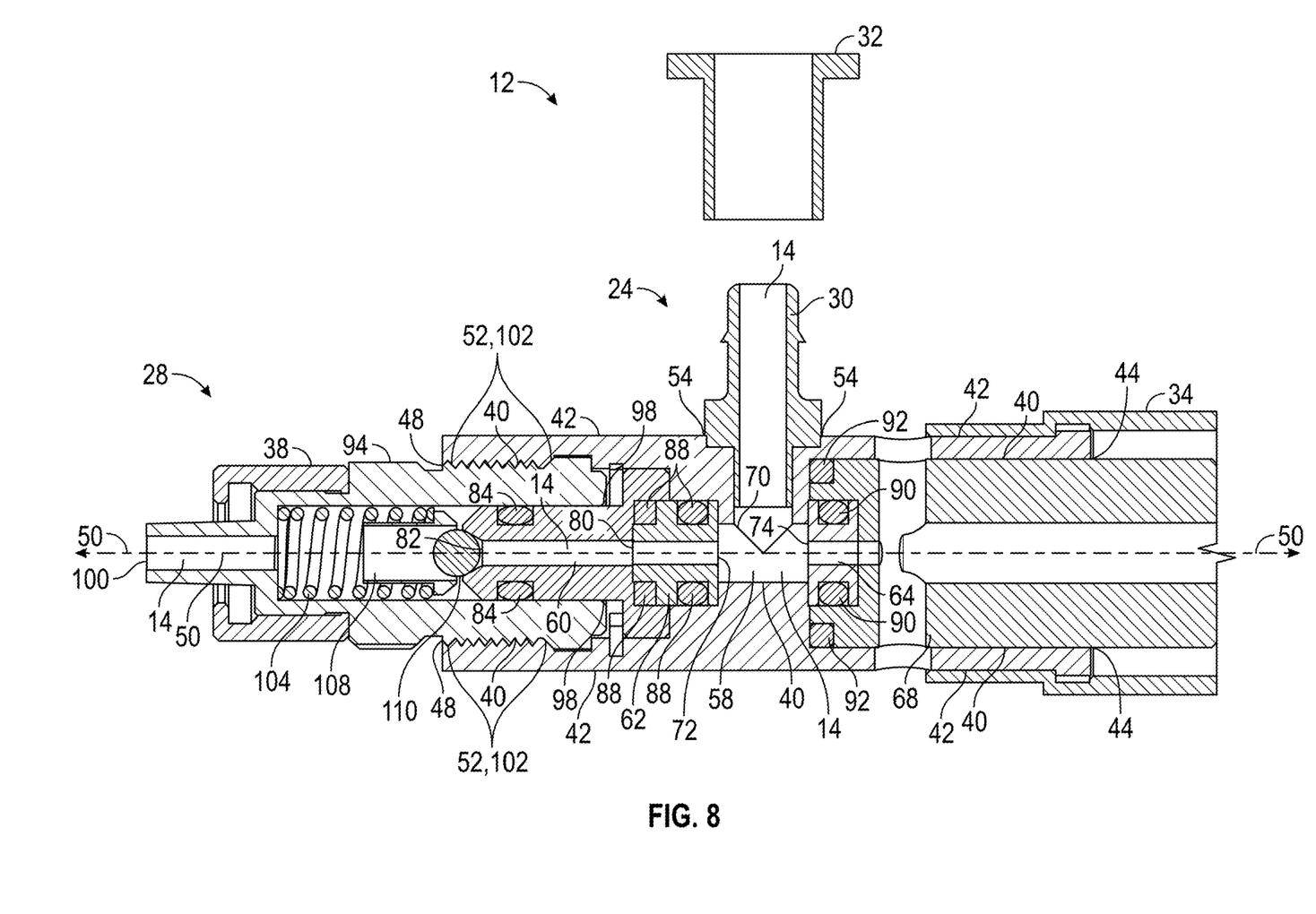
FIG. 8 is a cross-sectional view of the fluid body sub-assembly of the positive displacement pump of FIG. 1, wherein a negating check valve of the fluid body sub-assembly is fully attached.

As shown in more detail in FIGS. 7 and 8, the barbed fitting hose connector 30 forms the beginning of the flow path 14, receives pressurized fluid, and directs the received pressurized fluid into the fluid body 24.

The fluid body 24 has an elongated hollow shape that includes an interior surface 40 and an exterior surface 42 that define a first fluid opening 44 and a second fluid opening 48 disposed at opposite ends of a longitudinal axis 50 of the fluid body 24. The fluid body 24 may be fabricated from plastic, metal, or a composite thereof. The second fluid opening 48 of the fluid body 24 has a fluid-mating portion 52 formed on the interior surface 40 of the fluid body 24. The fluid-mating portion 52 extends along the interior surface 40 of the fluid body 24 from the second fluid opening 48 towards the first fluid opening 44. The fluid body 24 further includes a fitting port 54 disposed between the first fluid opening 44 and the second fluid opening 48 and receives the barbed fitting hose connector 30. The fitting port 54 allows the barbed fitting hose connector 30 to penetrate the fluid body 24. The fluid body 24 further includes a flooded-product chamber 58 disposed within the fluid body 24 between the first fluid opening 44 and the second fluid opening 48. The flooded-product chamber 58 is fluidly connected to the barbed fitting hose connector 30. The fluid body 24 further includes a sealing displacement chamber 60 disposed within the fluid body 24 between the first fluid opening 44 and the second fluid opening 48 and downstream from the flooded-product chamber 58. The sealing displacement chamber 60 is fluidly connected to the flooded-product chamber 58 and the negating check valve 28. The flooded-product chamber 58 and the sealing displacement chamber 60 form part of the flow path 14.

The fluid body 24 further includes an displacement rod fluid seal 62, disposed between the flooded-product chamber 58 and the sealing displacement chamber 60, as well as a fluid chamber seal 64, disposed between the first fluid opening 44 and the flooded-product chamber 58. The fluid body 24 further includes a piston rod bearing 68 disposed between the fluid chamber seal 64 and the first fluid opening 44.

The flooded-product chamber 58 may be defined by the interior surface 40 of the fluid body 24 and includes a first flooded opening 70, a second flooded opening 72 and a third flooded opening 74. The first flooded opening 70 is fluidly connected to the barbed fitting hose connector 30 and the second flooded opening 72 is fluidly connected to the sealing displacement chamber 60. The second flooded opening 72 and the third flooded opening 74 are disposed on opposite sides of the flooded-product chamber 58. The third flooded opening 74 is configured to receive a displacement rod 76 that passes through the first fluid opening 44 of the fluid body 24, the piston rod bearing 68, the fluid chamber seal 64 and the flooded-product chamber 58, as best seen in FIG. 1. The interior of the flooded-product chamber 58 is larger than the diameter of the received displacement rod 76. Thus, pressurized fluid can flow from the barbed fitting hose connector 30, around the received displacement rod 76, and into the flooded-product chamber 58.

The sealing displacement chamber 60 includes a sealing opening 80 and a chamber gateway opening 82. The sealing opening 80 of the sealing displacement chamber 60 is fluidly connected to the second flooded opening 72 of the flooded-product chamber 58. The chamber gateway opening 82 of the sealing displacement chamber 60 is fluidly connected to the negating check valve 28. An internal retaining ring 81 may secure the sealing displacement chamber 60 to the fluid body 24. The sealing displacement chamber 60 retains pressurized fluid to be dispensed by the negating check valve 28. The sealing displacement chamber 60 further includes an O-ring 84 disposed near the chamber gateway opening 82 that fluidly seals off the flow path 14 from the fluid-mating portion 52 of the fluid body 24.

Figure 17:
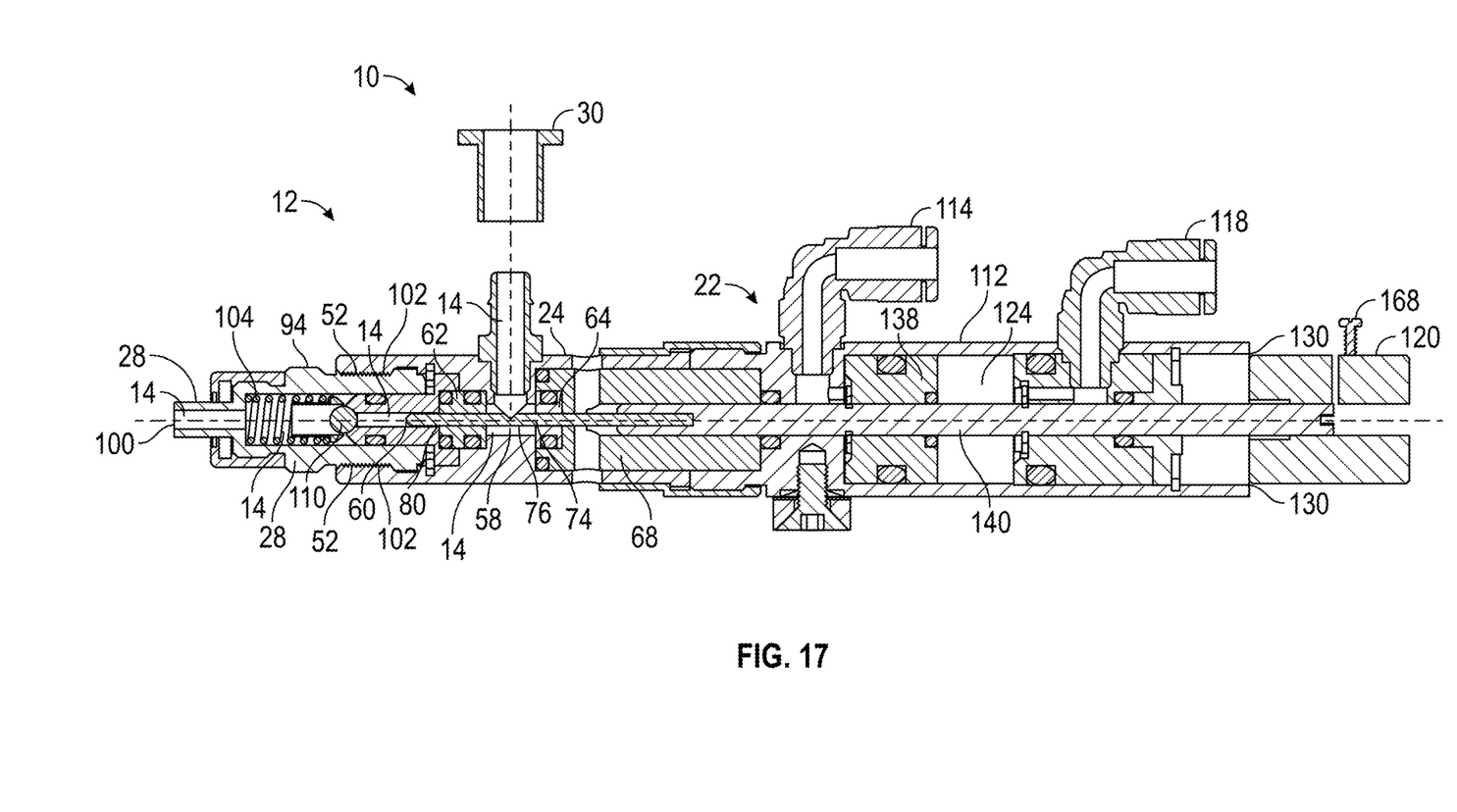
FIG. 17 is a cross-sectional view of the positive displacement pump of FIG. 1, wherein a cylinder of the positive displacement pump of FIG. 1 is in a section position.

The displacement rod fluid seal 62 includes one or more O-rings 88. The displacement rod fluid seal 62 allows pressurized fluid to flow from the flooded-product chamber 58 to the sealing displacement chamber 60. The displacement rod fluid seal 62 further allows the displacement rod 76 to pass through and penetrate the sealing displacement chamber 60, as best seen in FIG. 17. The displacement rod fluid seal 62 prevents pressurized fluid from flowing from the flooded-product chamber 58 to the sealing displacement chamber 60 while the displacement rod 76 is penetrating the sealing displacement chamber 60.

The fluid chamber seal 64 includes an O-ring 90. The fluid chamber seal 64 allows the displacement rod 76 to pass through and penetrate the flooded-product chamber 58 while preventing the pressurized fluid from flowing out of the third flooded opening 74 of the flooded-product chamber 58.

The piston rod bearing 68 includes an O-ring 92 disposed around the exterior of the piston rod bearing 68.

The negating check valve 28 includes a negating body 94 that has a negating opening 98 and a dispensing opening 100 disposed at opposite ends of the negating body 94. The negating body 94 defines a portion of the flow path 14. The negating opening 98 has a negating-mating portion 102 that extends along the exterior of the negating body 94 from the negating opening 98 towards the dispensing opening 100. The dispensing opening 100 terminates the flow path 14 and dispenses the pressurized fluid therefrom. The negating check valve 28 further includes a compression spring 104 disposed within the negating body 94 between the negating 98 and dispensing openings 100, a ball seat 108 disposed within the negating body 94 between the negating opening 98 and the compression spring 104, and a ball 110 disposed within the negating body 94 between negating opening 98 and the ball seat 108. The compression spring 104 exerts force upon the ball seat 108 and the ball 110.

The negating check valve 28 is attached to the fluid body 24 by mating the negating-mating portion 102 of the negating opening 98 of the negating check valve 28 with the fluid-mating portion 52 of the second fluid opening 48 of the fluid body 24. When the negating check valve 28 is attached to the fluid body 24, the negating opening 98 of the negating check valve 28 penetrates the second fluid opening 48 of the fluid body 24 and the chamber gateway opening 82 of the sealing displacement chamber 60 penetrates the negating opening 98 of the negating check valve 28. Further, the negating opening 98 of the negating check valve 28 is fluidly connected to the chamber gateway opening 82 of the sealing displacement chamber 60 and the O-ring 84 of the sealing displacement chamber 60 seals the flow path 14 so that pressurized fluid cannot flow into the negating-mating portion 102 and the fluid-mating portion 52. The negating check valve 28 may be fully or partially attached to the fluid body 24.

As shown in FIG. 8, when the negating check valve 28 is fully attached to the fluid body 24, the compression spring 104 is compressed and generates a force that lodges the ball 110 into the ball seat 108 and against the chamber gateway opening 82 of the sealing displacement chamber 60. When the ball 110 is lodged into the ball seat 108 such that the ball 110 is against the chamber gateway opening 82 of the sealing displacement chamber 60, the flow path 14 is blocked and the pressurized fluid cannot flow out of the dispensing opening 100 of the body 94 of the negating check valve 28.

Figure 9:
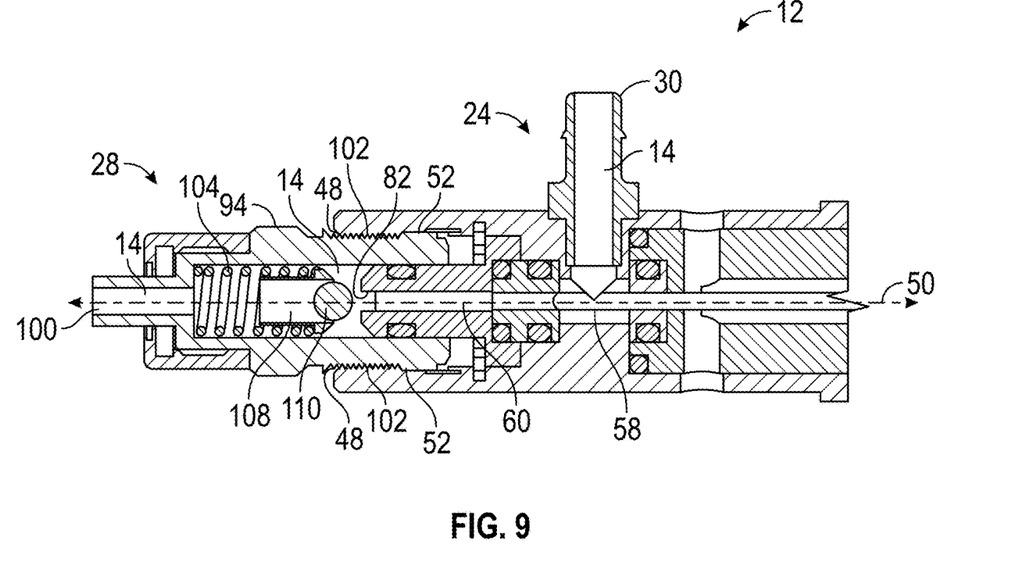
FIG. 9 is a cross-sectional view of the fluid body sub-assembly of the positive displacement pump of FIG. 1, wherein the negating check valve is partially attached.
Figure 10:
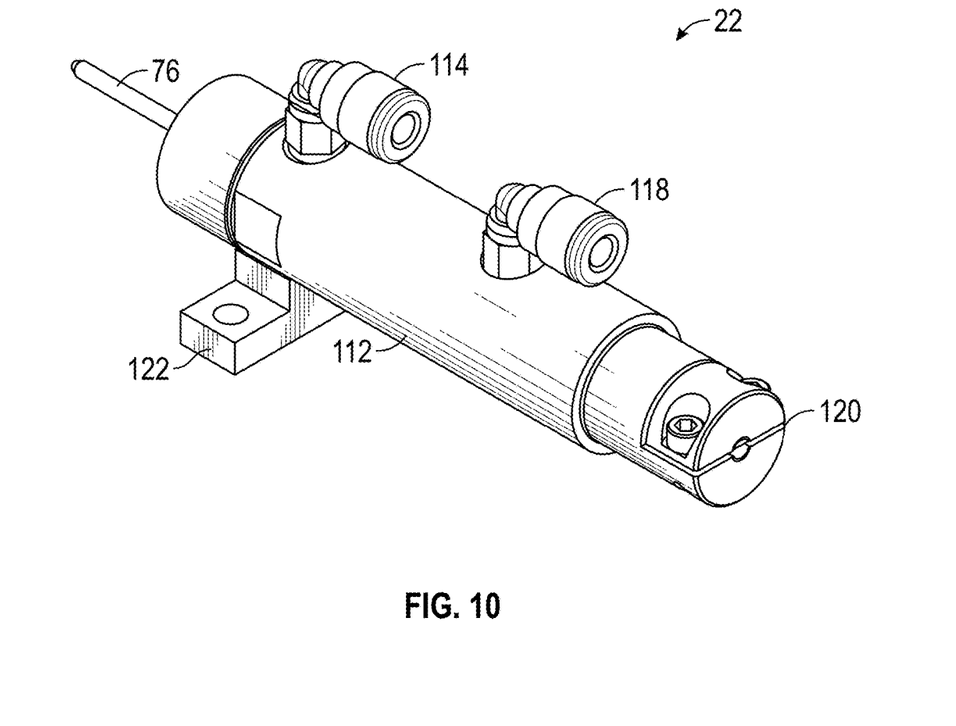
FIG. 10 is a front, top, right-hand side perspective view of a cylinder sub-assembly of the positive displacement pump of FIG. 1.
Figure 11:
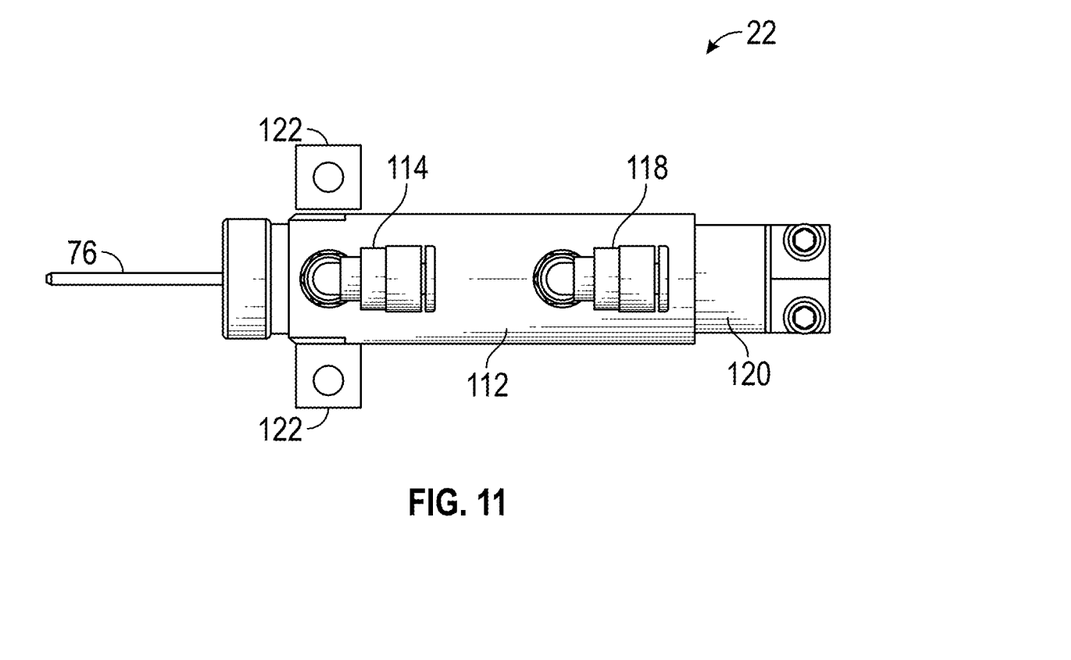
FIG. 11 is a top view of the cylinder sub-assembly of the positive displacement pump of FIG. 1.
Figure 12:
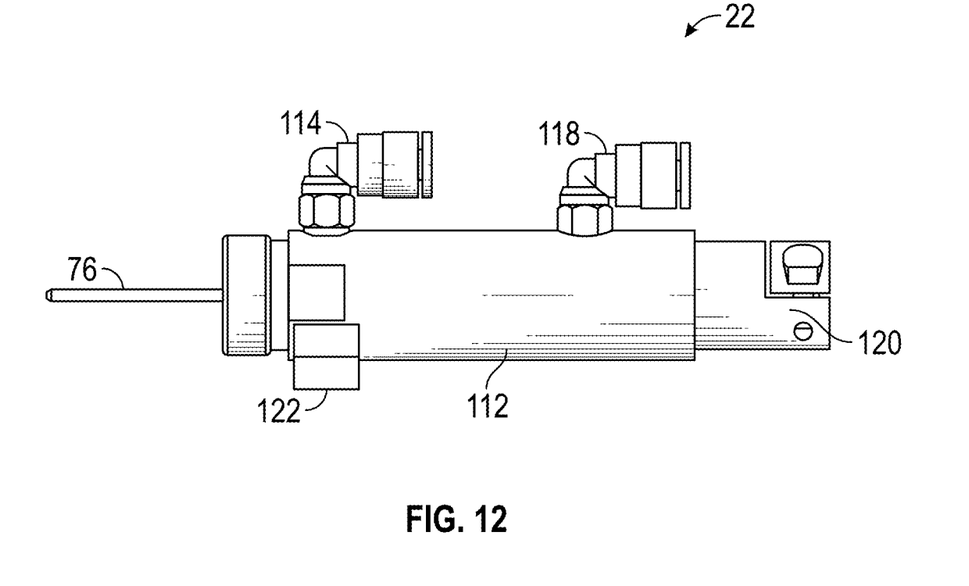
FIG. 12 is a front view of the cylinder sub-assembly of the positive displacement pump of FIG. 1.
Figure 13:
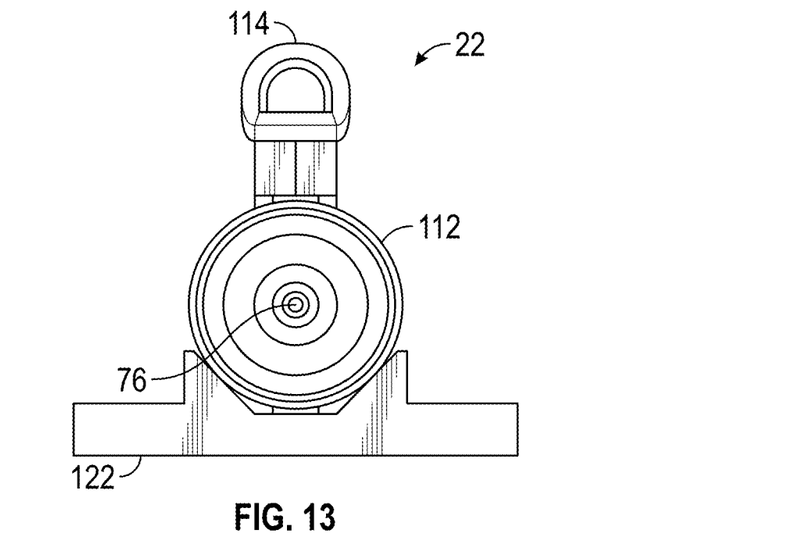
FIG. 13 is a left-hand side view of the cylinder sub-assembly of the positive displacement pump of FIG. 1.
Figure 14:
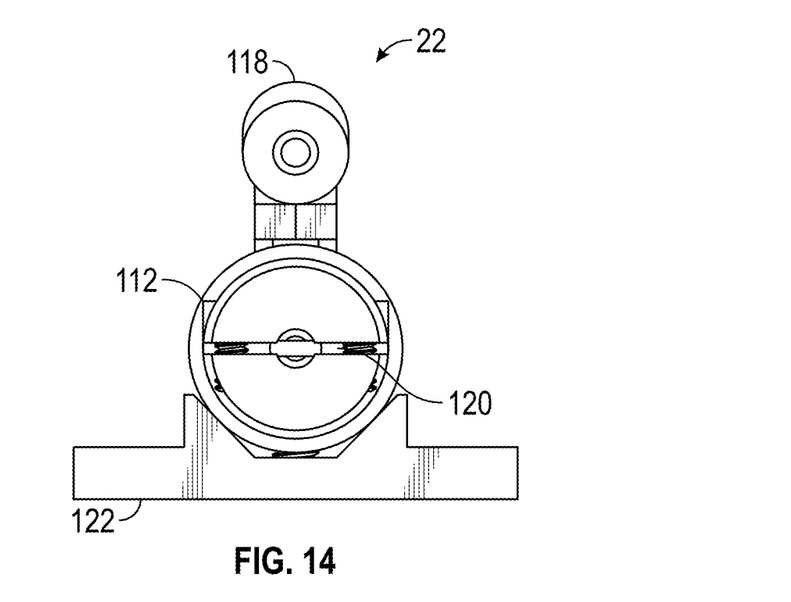
FIG. 14 is a right-hand side view of the cylinder sub-assembly of the positive displacement pump of FIG. 1.

As shown in FIG. 9, when the negating check valve 28 is partially attached to the fluid body 24, the compression spring 104 is relaxed such that the force generated by the compression spring 104 is less than the force generated by the compression spring 104 when the negating check valve 28 is fully attached to the fluid body 24. When the compression spring 104 is relaxed, the pressurized fluid entering through the barbed fitting hose connector 30 is able to flow along the flow path 14, around the ball 110, and out from the dispensing opening 100 of the negating check valve 28, as the spring 104 does not provide sufficient pressure or resistance on the ball 110 to prevent the pressurized fluid from flowing around the ball 110.

Referring to FIGS. 1 and 10-14, the cylinder sub-assembly 22 includes a cylinder housing 112 and the displacement rod 76. The cylinder housing 112 propels and retracts the displacement rod 76. The cylinder sub-assembly 22 further includes a first 114 and a second 118 pneumatic fitting connected to the cylinder housing 112 which direct pneumatic fluid and/or gas into the cylinder housing 112. The cylinder sub-assembly 22 further includes a stroke adjustor 120 that determines the distance the displacement rod 76 is propelled and retracted by the cylinder housing 112. The cylinder sub-assembly 22 may further include a valve-mounting bracket 122 attached to the cylinder housing 112.

Figure 15:
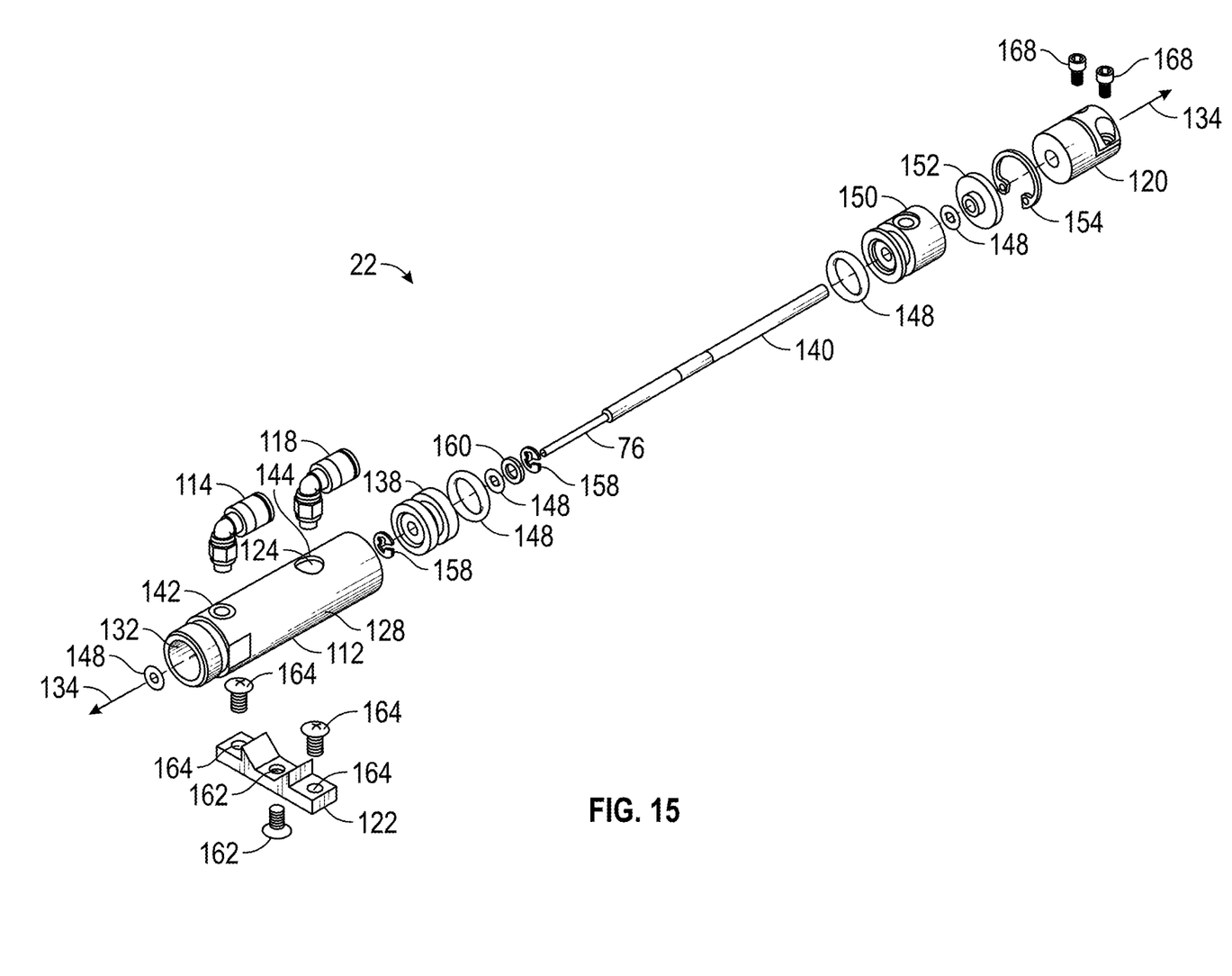
FIG. 15 is an exploded view of the cylinder sub-assembly of the positive displacement pump of FIG. 1.
Figure 16:
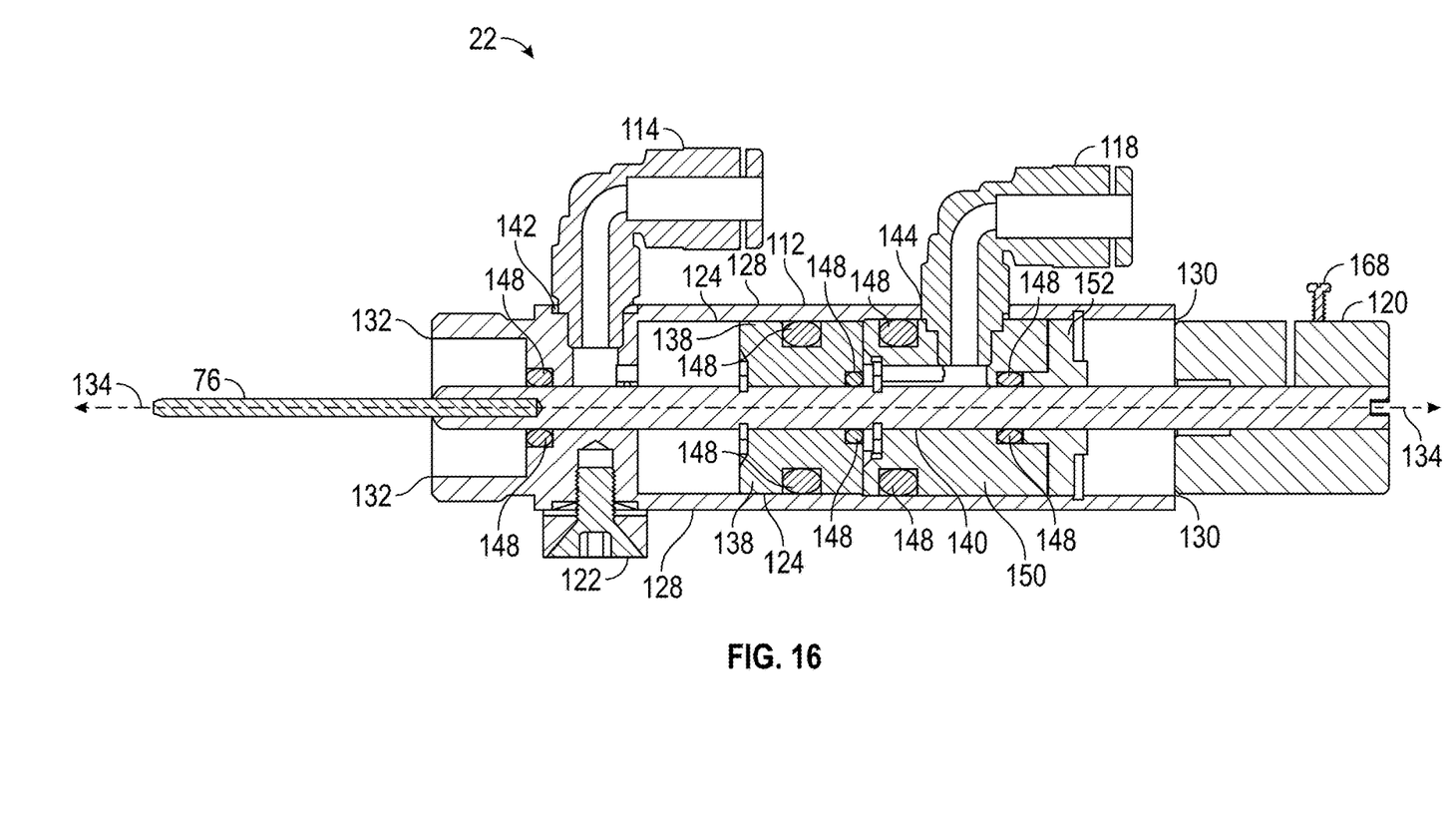
FIG. 16 is a cross-sectional view of the cylinder sub-assembly of the positive displacement pump of FIG. 1.

As shown in more detail in FIGS. 15 and 16, the cylinder housing 112 forms an interior cavity 124 and an exterior surface 128 and includes a first housing opening 130 and a second housing opening 132 disposed at opposite ends of the cylinder housing 112 along a longitudinal axis 134. The cylinder housing 112 may be fabricated from plastic, metal or a composite thereof. The cylinder housing 112 further includes a cylinder piston 138 and a piston rod 140 both disposed within the interior cavity 124. The piston rod 140 connects the displacement rod 76 to the cylinder piston 138. The cylinder housing 112 further includes a first and a second pneumatic fitting ports 142, 144 disposed between the first and the second housing openings 130, 132. The first and second pneumatic fitting ports 142, 144 fluidly connect the first and second pneumatic fittings 114, 118, respectively, to the interior cavity 124. The cylinder housing further includes one or more O-rings 148, an airport insert 150, a stroke hub 152 and an internal retaining ring 154 disposed within the interior cavity 124. One or more external retaining rings 158 and a shim 160 are mounted to the interior cavity 124 of the cylinder housing 112.

The first and the second pneumatic fittings 114, 118 direct the flow of a pneumatic fluid and/or gas (not shown) into the interior cavity 124 of the cylinder housing 112. The first 114 and the second 118 pneumatic fittings are attached to the first and the second pneumatic fitting ports 142, 144 such that the pneumatic fluid and/or gas does not leak out at the first and the second fitting ports.

The mounting bracket 122 is attached to the cylinder housing 112 by a first fastener 162, e.g., a screw, adhesive(s), soldering or welding. The mounting bracket 122 may include additional fasteners 164 for attaching the mounting bracket 122 to a structure (not shown). The additional fasteners 164 may be, for example, screws, adhesive(s), soldering or welding.

The displacement rod 76 penetrates the first fluid opening 44 of the fluid body 24 and is received by the third flooded opening 74 of the flooded product chamber 58. The cylinder piston 138 moves along the longitudinal axis 134 of the cylinder housing 112 between a first position, as best seen in FIG. 1, and a second position, as best seen in FIG. 17. The displacement rod 76 and/or the piston rod 140 may be guided by the one or more external retaining rings 158 and the shim 160. When the cylinder piston 138 is in the first position, the displacement rod 76 is clear of the sealing opening 80 of the sealing displacement chamber 60. When the cylinder piston 138 is in the second position, the displacement rod 76 penetrates the sealing displacement chamber 60.

The stoke adjustor 120 abuts the first housing opening 130 of the cylinder housing 112 and receives the piston rod 140. The stoke adjustor 120 determines how far the displacement rod 76 penetrates the sealing displacement chamber 60. The stoke adjustor 120 may include socket head screws 168 to adjust position of the displacement rod 76.

In operation, during operational dispensing mode of the positive displacement pump 10, the negating check valve 28 is fully attached to the fluid body 24 and pressurized fluid is fed into to the barbed fitting hose connector 30. The pressurized fluid then flows along the flow path 14 and into the flooded-product chamber 58. Pressurized pneumatic fluid and/or gas (not shown) is fed into the first pneumatic fitting 114 which directs the pressurized pneumatic fluid and/or gas into the interior cavity 124 of the cylinder housing 112 where it causes the cylinder piston 138 to move into the first position. When the cylinder piston 138 is in the first position, the displacement rod 76 is clear of the sealing opening 80 of the sealing displacement chamber 60. Accordingly, pressurized fluid flows along the flow path 14 and into the sealing displacement chamber 60.

When the negating check valve 28 is fully attached to the fluid body 24, the compression spring 104 provides sufficient force to prevent the pressurized fluid from flowing around the ball 110. Thus, the pressurized fluid is prevented from flowing into the negating check valve 28.

After pressurized fluid has filled the sealing-displacement chamber 60, the positive displacement pump 10 may be primed so as to remove any air trapped within the flow path 14. Priming is accomplished by loosening the negating check valve 28 from the fluid body 24 of the fluid body sub-assembly 12 until the negating check valve 28 is partially attached to the fluid body 24. When the negating check valve 28 is partially attached to fluid body 24, trapped air in the flow path 14 can escape via the dispensing opening 100 of the negating body 94 of the negating check valve 28.

As shown in FIG. 9, the negating check valve 28 is partially attached to the fluid body 24 such that the compression spring 104 has relaxed to the point where the pressurized fluid and the trapped air flow around the ball 110, along the flow path 14, and out of the dispensing opening 100 of the negating body 94 of the negating check valve 28. Thus, as the pressurized fluid enters the barbed fitting hose 30 and passes through the flooded-product chamber 58 and sealing displacement chamber 60, the fluid flows past the ball 110 since the spring 104 does not provide sufficient pressure or resistance on the ball 110 to prevent the pressurized fluid from flowing around the ball 110. Therefore, the pressure of the fluid entering the flow path 14 through the barbed fitting hose 30 is the same as when the pressurized fluid exists through the dispensing opening 100 of the negating check valve 28. Further, the negating body 94 may be attached to the fluid body 24 at a variable degree of attachment having a maximum degree when the negating check valve 28 is fully attached to the fluid body 24. Accordingly, the rate of flow of the pressurized fluid through the flow path 14 during priming can be varied by varying (tightening/loosening) the degree of attachment of the negating body 94 of the negating check valve 28 to the fluid body 24. The greater the degree of attachment of the negating check valve 28 to the fluid body 24, the slower the flow of the pressurized fluid through the flow path 14. Likewise, the lesser the degree of attachment of the negating check valve 28 to the fluid body 24, the greater the flow of the pressurized fluid through the flow path 14.

The pressurized fluid is allowed to continuing flowing out of the dispensing opening 100 of the negating body 94 of the negating check valve 28 until the trapped air has been removed from the flow path 14. Further, the flow path 14 remains sealed while the negating check valve 28 is partially attached to the fluid body 24 during the priming of the positive displacement pump 10. Thus, the pressurized fluid is unable to flow into the negating-mating portion 102 or the fluid-mating portion 52 when the fluid body sub-assembly 12 is primed.

As shown in FIG. 1, when the trapped air has been removed from the flow path 14, the negating check valve 28 is then fully attached to the fluid body sub-assembly 12 and the compression spring 104 generates predetermined force to prevent the pressurized fluid from flowing around the ball 110. Accordingly, the pressurized fluid is prevented from flowing into the negating check valve 28 and thus fills the flooded product chamber 58 and the sealing displacement chamber 60.

Referring to FIG. 17, once the positive displacement pump 10 has been primed, pressurized pneumatic fluid and/or gas (not shown) is fed into the second pneumatic fitting 118 and travels down into the interior cavity 124 of the cylinder housing 112 to cause the cylinder piston 138 to move to the second position. When the cylinder piston 138 is in the second position, the displacement rod 76 penetrates the sealing displacement chamber 60, acting against the pressurized fluid within the sealing displacement chamber 60. The displacement rod fluid seal 62 prevents any pressurized fluid from flowing from the flooded product chamber 58 into the sealing displacement chamber 60 while the displacement rod 76 is penetrating the sealing displacement chamber 60.

When the displacement rod 76 acts up against the pressurized fluid within the sealing displacement chamber 60, the force overcomes the compression spring 104 and the pressurized fluid flows around the ball 110. The pressurized fluid then flows into the negating check valve 28 along the flow path 14 until it is dispensed out of the dispensing opening 100 of the negating body 94 of the negating check valve 28.

The degree of the penetration of the displacement rod 76 into the sealing displacement chamber 60, as determined by the stroke adjustor 120, determines the amount of the pressurized fluid dispensed from the dispensing opening 100 of the negating check valve 28. For example, the stoke adjustor 120 can be set so that the positive displacement pump 10 dispenses small drops of pressurized fluid in variable discrete amounts. The variable discrete amounts may range in size according to the type of pressurized fluid in the flow path 14. For instance, the variable discrete amounts may range between 0.0015 grams to 0.015 grams, but other ranges are possible too.

The negating check valve 28 of the present application is particularly advantageous. For example, by allowing trapped air to flow through the dispensing opening 100 of the negating body 94 of the negating check valve 28, the fluid body sub-assembly 12 can be quickly and safely primed with no air remaining trapped within the flow path 14.

Further, because the negating check valve 28 can prime the fluid body sub-assembly 12 without the need of an additional bleed hole and/or threaded plug, there is no risk of the additional bleed hole becoming clogged. This is particularly useful when the pressurized fluid is an adhesive that may permanently plug the bleed hole.

Additionally, because the flow path 14 remains sealed even when the negating check valve 28 is partially attached to the fluid body 24, the pressurized fluid does not leak into the negating-mating portion 102 or the fluid-mating portion 52. This is especially advantageous when the pressurized fluid is an adhesive, as there is no risk that the negating check valve 28 will become permanently bonded to fluid body 24. Accordingly, the negating check valve 28 requires less maintenance than other types of valves.

Although this invention has been shown and described with respect to detailed embodiments thereof, it will be understood by those skilled in the art that various changes in form and detail thereof may be made without departing from the spirit and the scope of the invention.

For example, the fluid body sub-assembly 12 and the cylinder sub-assembly 22 may be integrated as a single assembly unit. Additionally, the fittings 114 and 118 may be integrated into the cylinder housing 112 so as to form a single unit. Further, the displacement rod fluid seal 62 may be integrated into the sealing displacement chamber 60. Further still, the ball 110 may be a generic Teflon ball or any other suitable type of ball. Also, the fluid chamber seal 64 may be integrated into the piston rod bearing 68. Moreover, the pressurized fluid may be a non-compressible fluid. Additionally, the negating-mating portion 102 and the fluid-mating portion 52 may be any type of mating system such as magnets, interlocking groves, and/or snap-in connectors. For example, as shown in the figures, the negating-mating portion 102 may be a threaded and/or grooved portion and the fluid-mating portion 52 may be a threaded and/or grooved portion and the negating-mating portion 102 may be mated with the fluid-mating portion 52 by screwing/securing the negating-mating portion 102 into the fluid-mating portion 52.

Further, it is also to be understood that the terminology used is for the purpose of describing particular embodiments only, and is not intended to limit the scope of the claims of the present application.

What is claimed is:

1. A positive displacement pump for dispensing fluid comprising:
a fluid body sub-assembly including a fluid body and a negating check valve, which can be fully or partially attached to the fluid body, the negating check valve including a negating body defining a dispensing opening;
wherein the fluid body and the negating body form a flow path for the fluid;
wherein the fluid is dispensed through the dispensing opening; and
wherein the positive displacement pump is configured to be primed by loosening the negating check valve from being fully attached to the fluid body of the fluid body sub-assembly until the negating check valve is partially attached to the fluid body to allow trapped air within the flow path to flow out of the dispensing opening.

2. The positive displacement pump according to claim 1, wherein the negating check valve is attached to the fluid body at a varying degree of attachment, the varying degree of attachment including a maximum degree of attachment;
wherein, when the degree of attachment is the maximum degree, the negating check valve is fully attached to the fluid body; and
wherein, when the degree of attachment is not the maximum degree, the fluid is allowed to flow out of the dispensing opening at a rate that varies with the degree of attachment.

3. The positive displacement pump according to claim 1, wherein the fluid body includes a fluid-mating portion and the negating body includes a negating-mating portion; and
wherein the negating check valve is attached to the fluid body by mating the fluid-mating portion with the negating-mating portion.

4. The positive displacement pump according to claim 1, further comprising a sealing displacement chamber that forms part of the flow path and includes a chamber gateway opening.

5. The positive displacement pump according to claim 4, wherein the negating check valve further comprises:
a ball disposed within the negating body between the dispensing opening and the chamber gateway opening; and
a compression spring disposed within the negating body between the dispensing opening and the ball.

6. The positive displacement pump according to claim 5 is primed such that when the negating check valve is fully attached to the fluid body, the compression spring lodges the ball against the chamber gateway opening such that the fluid does not flow out of the dispensing opening and when the negating check valve is partially attached to the fluid body, the fluid overcomes the force of the compression spring and flows around the ball and out of the dispensing opening.

7. The positive displacement pump according to claim 1, wherein the fluid is dispensed in variable discrete amounts.

8. A negating check valve for a positive displacement pump for dispensing fluid comprising:
   a negating body defining a dispensing opening and including a negating-mating portion;
   a ball disposed within the negating body; and
   a spring disposed within the negating body between the dispensing opening and the ball;
   wherein the fluid is dispensed through the dispensing opening;
   wherein the negating check valve can be fully or partially attached to a fluid body of the positive displacement pump; and
   wherein the negating check valve is configured to be loosened from being fully attached to the fluid body of the dispensing pump until the negating check valve is partially attached to the fluid body of the dispensing pump to allow trapped air within the positive displacement pump to flow out of the dispensing opening during priming of the positive displacement pump.

9. The negating check valve according to claim 8, wherein the negating check valve is attached to the fluid body of the positive displacement pump by mating the negating-mating portion with a fluid-mating portion of the fluid body.

10. The negating check valve according to claim 8, wherein the negating check valve primes the positive displacement pump such that when the negating check valve is fully attached to the fluid body, the compression spring lodges the ball against a chamber gateway opening of the fluid body such that the fluid does not flow out of the dispensing opening and when the negating check valve is partially attached to the fluid body, the fluid overcomes the force of the compression spring and flows around the ball and out of the dispensing opening.

11. The negating check valve according to claim 8, wherein the fluid is dispensed in variable discrete amounts.

12. A positive displacement pump for dispensing fluid comprising:
   a fluid body sub-assembly including a fluid body and a negating check valve, which can be fully or partially attached to the fluid body, the fluid body including a sealing displacement chamber with a chamber gateway opening, the negating check valve including a negating body defining a dispensing opening; and
   a cylinder sub-assembly connected to the fluid body sub-assembly, the cylinder sub-assembly including a displacement rod;
   wherein the fluid body and the negating body form a flow path for the fluid;
   wherein the positive displacement pump dispenses the fluid when the cylinder sub-assembly causes the displacement rod to penetrate the sealing displacement chamber to force an amount of fluid disposed within the sealing displacement chamber to flow out of the chamber gateway opening along the flow path and out of the dispensing opening; and
   wherein the positive displacement pump is configured to be primed by loosening the negating check valve from being fully attached to the fluid body of the fluid body sub-assembly until the negating check valve is partially attached to the fluid body to allow trapped air within the flow path to flow out of the dispensing opening.

13. The positive displacement pump according to claim 12, wherein the negating body includes a threaded portion and the fluid body includes a threaded portion; and
   wherein the negating check valve is attached to the fluid body by securing the negating check valve to the fluid body.

14. The positive displacement pump according to claim 12, wherein the negating check valve further comprises:
   a ball disposed within the negating body between the dispensing opening and the chamber gateway opening; and
   a compression spring disposed within the negating body between the dispensing opening and the ball.

15. The positive displacement pump according to claim 14, wherein the positive displacement pump is primed such that when the negating check valve is fully attached to the fluid body, the compression spring lodges the ball against the chamber gateway opening such that the fluid does not flow out of the dispensing opening and when the negating check valve is partially attached to the fluid body, the fluid overcomes the force of the compression spring and flows around the ball and out of the dispensing opening.

16. The positive displacement pump according to claim 12, wherein the fluid is dispensed in variable discrete amounts.

17. A positive displacement pump for dispensing fluid comprising:
   a fluid body sub-assembly including a fluid body and a negating check valve, which can be fully engaged or partially engaged to the fluid body, the negating check valve including a negating body defining a dispensing opening and further comprises: a ball disposed within the negating body between the dispensing opening and the chamber gateway opening; and a compression spring disposed within the negating body between the dispensing opening and the ball;
   wherein the fluid body and the negating body form a flow path for the fluid;
   wherein the positive displacement pump further comprises a sealing displacement chamber that forms part of the flow path and includes a chamber gateway opening;
   wherein the fluid is dispensed through the dispensing opening;
   wherein the positive displacement pump is primed by allowing trapped air within the flow path to flow out of the dispensing opening such that when the negating check valve is fully engaged to the fluid body, the compression spring lodges the ball against the chamber gateway opening such that the fluid does not flow out of the dispensing opening and when the negating check valve is partially engaged to the fluid body, the fluid overcomes the force of the compression spring and flows around the ball and out of the dispensing opening; and
   wherein the positive displacement pump is a single self-contained device in which the fluid body and the negating check valve are rigidly connected and in which the functional components to achieve primping and pumping are contained within the fluid body and the negating check valve.

18. A positive displacement pump for dispensing fluid comprising:
   a fluid body sub-assembly including a fluid body and a negating check valve attached to the fluid body, the fluid body including a sealing displacement chamber with a chamber gateway opening, the negating check valve including a negating body defining a dispensing opening and further comprises:

a ball disposed within the negating body between the dispensing opening and the chamber gateway opening; and a compression spring disposed within the negating body between the dispensing opening and the ball; and    a cylinder sub-assembly connected to the fluid body sub-assembly, the cylinder sub-assembly including a displacement rod;

wherein the fluid body and the negating body form a flow path for the fluid;

wherein the positive displacement pump dispenses the fluid when the cylinder sub-assembly causes the displacement rod to penetrate the sealing displacement chamber to force an amount of fluid disposed within the sealing displacement chamber to flow out of the chamber gateway opening along the flow path and out of the dispensing opening; and    wherein the negating check valve can be fully or partially engaged to the fluid body;

wherein the trapped air within the flow path flows out of the dispensing opening when the negating check valve is partially engaged to the fluid body;

wherein the positive displacement pump is primed by allowing trapped air within the flow path to flow out of the dispensing opening such that when the negating check valve is fully engaged to the fluid body, the compression spring lodges the ball against the chamber gateway opening such that the fluid does not flow out of the dispensing opening and when the negating check valve is partially engaged to the fluid body, the fluid overcomes the force of the compression spring and flows around the ball and out of the dispensing opening;

wherein the positive displacement pump is a single self-contained device in which the fluid body and the negating check valve are rigidly connected and in which the functional components to achieve primping and pumping are contained within the fluid body and the negating check valve.

* * * * *